US012172433B2

(12) United States Patent
Landa et al.

(10) Patent No.: US 12,172,433 B2
(45) Date of Patent: Dec. 24, 2024

(54) PREVENTING DAMAGE TO PRINTED SUBSTRATES CONVEYED IN A PRINTING SYSTEM

(71) Applicant: Landa Corporation Ltd., Rehovot (IL)

(72) Inventors: Benzion Landa, Nes Ziona (IL); Rotem Adar, Ra'anana (IL); Evgeniy Pelepey, Ashdod (IL)

(73) Assignee: LANDA CORPORATION LTD., Rehovot (IL)

( * ) Notice: Subject to any disclaimer, the term of this patent is extended or adjusted under 35 U.S.C. 154(b) by 0 days.

(21) Appl. No.: 18/482,917

(22) Filed: Oct. 9, 2023

(65) Prior Publication Data

US 2024/0034054 A1 Feb. 1, 2024

Related U.S. Application Data

(63) Continuation of application No. 17/599,567, filed as application No. PCT/IB2020/052662 on Mar. 22, 2020, now Pat. No. 11,820,130.

(Continued)

(51) Int. Cl.
*B41J 2/005* (2006.01)
*B41J 13/00* (2006.01)
(Continued)

(52) U.S. Cl.
CPC ......... *B41J 2/0057* (2013.01); *B41J 13/0036* (2013.01); *B41J 13/22* (2013.01);
(Continued)

(58) Field of Classification Search
CPC ...... B41J 2/0057; B41J 13/0036; B41J 13/22; B41J 13/223; B41J 2002/012; B41J 2/01;
(Continued)

(56) References Cited

U.S. PATENT DOCUMENTS

| | | | |
|---|---|---|---|
| 9,290,016 | B2 | 3/2016 | Landa et al. |
| 11,820,130 | B2 | 11/2023 | Landa et al. |

(Continued)

FOREIGN PATENT DOCUMENTS

| | | | |
|---|---|---|---|
| JP | 2005313519 | A | 11/2005 |
| JP | 2007001185 | A | 1/2007 |

(Continued)

OTHER PUBLICATIONS

JP2005313519A Machine Translation (by EPO and Google)—published Nov. 10, 2005; Toppan Printing Co Ltd.

(Continued)

*Primary Examiner* — Henok D Legesse
(74) *Attorney, Agent, or Firm* — MEITAR PATENTS LTD.

(57) ABSTRACT

A system includes an image forming station, which is configured to apply droplets of one or more printing fluids to a target substrate, so as to form an image thereon, and a substrate conveyor, which includes one or more perforated plates having multiple openings, and is configured to grip and move the target substrate to and from the image forming station for forming the image, the substrate conveyor includes one or more rotatable elements, which are fitted in the respective openings, and are configured to provide mechanical support to the target substrate, and when the target substrate moves over the one or more rotatable elements, at least one of the rotatable elements is configured to rotate in response to a physical contact with the target substrate.

18 Claims, 6 Drawing Sheets

Related U.S. Application Data

(60) Provisional application No. 62/828,509, filed on Apr. 3, 2019.

(51) Int. Cl.

| | |
|---|---|
| ***B41J 13/22*** | (2006.01) |
| ***B65H 5/06*** | (2006.01) |
| ***B65H 5/08*** | (2006.01) |
| ***B65H 29/04*** | (2006.01) |
| *B41J 2/01* | (2006.01) |
| *B65H 29/52* | (2006.01) |

(52) U.S. Cl.

CPC ............ *B41J 13/223* (2013.01); *B65H 5/066* (2013.01); *B65H 5/085* (2013.01); *B65H 29/04* (2013.01); *B41J 2002/012* (2013.01); *B65H 29/52* (2013.01); *B65H 2401/11* (2013.01); *B65H 2404/54* (2013.01); *B65H 2404/696* (2013.01); *B65H 2801/15* (2013.01); *B65H 2801/21* (2013.01)

(58) Field of Classification Search

CPC ........ B65H 5/066; B65H 5/085; B65H 29/04; B65H 29/52; B65H 2401/11; B65H 2404/54; B65H 2404/696; B65H 2801/15; B65H 2801/21; B65H 2301/132; B65H 5/38; G03G 15/6529; G03G 15/6558

See application file for complete search history.

(56) References Cited

U.S. PATENT DOCUMENTS

| | | | | |
|---|---|---|---|---|
| 2005/0270351 | A1 | 12/2005 | Mouri et al. | |
| 2006/0192804 | A1 | 8/2006 | Nakata et al. | |
| 2011/0226061 | A1 | 9/2011 | Itsumi et al. | |
| 2011/0316924 | A1 * | 12/2011 | Kobayashi | B41J 11/06 347/16 |
| 2017/0003266 | A1 | 1/2017 | Goto et al. | |
| 2022/0379598 | A1 | 12/2022 | Landa et al. | |

FOREIGN PATENT DOCUMENTS

| | | | |
|---|---|---|---|
| JP | 2007217096 | A * | 8/2007 |
| JP | 2010076910 | A | 4/2010 |
| JP | 2015514606 | A | 5/2015 |
| JP | 2015174750 | A | 10/2015 |

OTHER PUBLICATIONS

JP2007001185A Machine Translation (by EPO and Google)—published Jan. 11, 2007; Olympus Corp.

JP2010076910A Machine Translation (by EPO and Google)—published Apr. 8, 2010; Brother Ind Ltd.

JP2015174750A Machine Translation (by EPO and Google)—published Oct. 5, 2015;.

* cited by examiner

PREVENTING DAMAGE TO PRINTED SUBSTRATES CONVEYED IN A PRINTING SYSTEM

CROSS-REFERENCE TO RELATED APPLICATIONS

This application is a continuation application of U.S. patent application Ser. No. 17/599,567 filed Sep. 29, 2021, which is a U.S. National Phase of PCT Application PCT/IB2020/052662, which claims the benefit of U.S. Provisional Patent Application 62/828,509 filed Apr. 3, 2019. The disclosures of these related applications are incorporated herein by reference.

FIELD OF THE INVENTION

The present invention relates generally to digital printing systems, and particularly to methods and systems for preventing damage to printed substrates in a printing system.

BACKGROUND OF THE INVENTION

Various methods and systems for handling substrates and preventing friction and surface damage are known in the art.

For example, U.S. Patent Application Publication 2018/0229516 describes an inkjet printing device that includes a vacuum flatbed table configured to support large and flat substrates with applied vacuum power and while printing, in a hold down area, against the vacuum flatbed table. The inkjet printing device further includes a removable flat substrate support device configured to support large and flat substrates while printing, and a vacuum belt connected to a plurality of pulleys and wrapped around the vacuum flatbed table. The vacuum flatbed table is configured for coupling the removable flat substrate support device stationary to the vacuum flatbed table by applied vacuum power, and the vacuum belt is sandwiched between the removable flat substrate support device and the vacuum flatbed table.

U.S. Pat. No. 7,284,479 describes a stencil printer operable in a duplex print mode. The stencil printer prints an image on one side of a sheet and then prints another image on the other side of the same sheet. The printer includes at least one print drum and at least one press roller facing the print drum for pressing the sheet against the print drum. When the press roller is used to press the other side of the sheet against the print drum, the press roller is implemented as an elastic body provided with a fluorine compound layer on the surface thereof.

U.S. Pat. No. 4,786,045 describes a registration mechanism for offsetting paper sets against a registration edge which is alternately in an inboard and an outboard position. The paper sheet is urged against the registration edge by means of two rotating urethane paddle wheels positioned relatively closely to the registration edge, but the sheet is prevented from generating too much angular velocity by two restraining means in the form of TEFLON balls held in retainers which prevent the balls from moving laterally but allow the balls to move vertically and rotationally, these restraining means located relatively further away from the registration edge.

U.S. Pat. No. 5,096,291 describes a positioning system for positioning a part or element in different inclinations relative to a plane normal to a central axis, and for also rotating the part about the central axis. A holder supporting the part is freely pivotable about a point on the central axis. A central spindle on the axis is coupled to a concentric tiltable ring assembly that is controllable in two directions of freedom from an input device.

U.S. Pat. No. 3,764,188 describes an anti-friction bearing is made by replacing one or more of the conventional roller elements with TFE or FEP elements of the same size and shape. After a short break-in period, a thin anti-friction film or TFE or FEP will transfer onto the races and the other bearing elements and will be maintained throughout the life of the bearing by additional transfer from the fluoroplastic roller elements to preclude the surface coating from wearing through.

PCT International Publication WO 2005/037691 describes a free ball bearing, comprising a body with a semi-spherical recessed face, a large number of small balls disposed in the semi-spherical recessed face of the body, a large ball placed on the large number of small balls, and a cap preventing the large ball and the small balls from being ejected.

SUMMARY OF THE INVENTION

An embodiment of the present invention that is described herein provides a system including an intermediate transfer member (ITM) and a substrate conveyor. The ITM is configured to receive droplets of one or more printing fluids so as to form an image thereon, and to transfer the image to a target substrate. The substrate conveyor is configured to grip and move the target substrate to and from the ITM for transferal of the image, the substrate conveyor includes one or more rotatable elements, which are configured to provide mechanical support to the target substrate, such that, when the target substrate moves over the one or more rotatable elements, at least one of the rotatable elements is configured to rotate in response to a physical contact with the target substrate.

In some embodiments, at least one of the rotatable elements is mounted on an axis. In other embodiments, the substrate conveyor has one or more slots, which are configured to receive the axis at a first angle and to lock the axis at a second angle. In yet other embodiments, the substrate conveyor is configured to move the target substrate along a first direction, and the axis is positioned along a second direction, perpendicular to the first direction.

In an embodiment, the axis is shared by two or more of the rotatable elements. In another embodiment, at least one of the rotatable elements has a shape selected from a list consisting of a ball and a cylinder. In yet another embodiment, at least one of the rotatable elements includes an ink-repellent material.

In some embodiments, the ink-repellent material includes polytetrafluoroethylene (PTFE). In other embodiments, the rotatable elements are arranged in one or more arrays. In yet other embodiments, the substrate conveyor includes a frame, which is configured to fix the rotatable elements at respective positions of the one or more arrays.

In an embodiment, at least one of the rotatable elements is mounted on an axis, and the frame is configured to fix the axis at one of the respective positions. In another embodiment, the rotatable elements of the one or more arrays are fitted along a curved surface. In yet another embodiment, the substrate conveyor includes a perforated plate having multiple openings, and the movable elements are fitted in the respective openings. In some embodiments, the perforated plate is curved. In other embodiments, the rotatable elements are configured to prevent damage at least to a surface of the target substrate that is making the physical contact with one or more of the rotatable elements. In yet other embodiments, the surface of the target substrate that is making the physical contact with the one or more of the rotatable elements, includes the image.

There is additionally provided, in accordance with an embodiment of the present invention, apparatus to be assembled to a substrate conveyor of a digital printing system, the apparatus includes one or more rotatable elements and a mounting element. The one or more rotatable elements are configured to provide mechanical support to a target substrate, such that when the target substrate moves along the substrate conveyor over the one or more rotatable elements, at least one of the rotatable elements is configured to rotate in response to a physical contact with the target substrate. The mounting element is configured to fix the one or more rotatable elements at one or more respective positions.

In some embodiments, the surface of the target substrate that is in the physical contact with the one or more of the rotatable elements, includes an image formed by the digital printing system. In other embodiments, the rotatable elements are arranged in one or more arrays, and the one or more arrays are configured to conform to a shape of the mounting element.

There is additionally provided, in accordance with an embodiment of the present invention, a method including providing one or more rotatable elements for mechanically supporting a target substrate, such that when the target substrate moves over the one or more rotatable elements, at least one of the rotatable elements rotates in response to a physical contact with the target substrate. The one or more rotatable elements are fixed at one or more respective positions of a mounting element, and the mounting element is assembled to a substrate conveyor of a digital printing system.

In an embodiment, assembling the mounting element includes assembling the mounting element to the substrate conveyor at production of the digital printing system. In another embodiment, assembling the mounting element includes assembling the mounting element to the substrate conveyor of the digital printing system after concluding the production of the digital printing system. In yet another embodiment, assembling the mounting element includes assembling the mounting element to the substrate conveyor of the digital printing system after installing the digital printing system at a printing facility.

There is further provided, in accordance with an embodiment of the present invention, a method including forming, on an intermediate transfer member (ITM), an image by receiving droplets of one or more printing fluids, and transferring the image to a target substrate. The target substrate is gripped and moved to and from the ITM for transferal of the image and for moving the target substrate over one or more arrays of rotatable elements that provide a mechanical support to the target substrate, when the target substrate is moved over the one or more arrays, at least one of the rotatable elements rotates in response to a physical contact with the target substrate.

There is additionally provided, in accordance with an embodiment of the present invention, a system including an intermediate transfer member (ITM) and a substrate conveyor. The ITM is configured to receive droplets of one or more printing fluids so as to form an ink image thereon, and to transfer the ink image to a target substrate. The substrate conveyor is configured to move the target substrate to and from the ITM for transferal of the image, the substrate conveyor includes a moving gripper and one or more arrays of rotatable elements. The moving gripper is configured to grip and move the target substrate. The one or more arrays of rotatable elements are configured to provide mechanical support to the target substrate, when the gripper moves the target substrate over the one or more arrays, at least one of the rotatable elements is configured to rotate in response to a physical contact with the target substrate.

There is further provided, in accordance with an embodiment of the present invention, a method including forming, on an intermediate transfer member (ITM), an ink image by receiving droplets of one or more printing fluids, and transferring the ink image to a target substrate. The target substrate is moved to and from the ITM for transferring the image by gripping and moving the target substrate over one or more arrays of rotatable elements that provide a mechanical support to the target substrate, when the target substrate is moved over the one or more arrays, at least one of the rotatable elements rotates in response to a physical contact with the target substrate.

There is additionally provided, in accordance with an embodiment of the present invention, a system including an image forming station and a substrate conveyor. The image forming station is configured to apply droplets of one or more printing fluids to a target substrate, so as to form an image thereon. The substrate conveyor is configured to grip and move the target substrate to and from the image forming station for forming the image, the substrate conveyor includes one or more rotatable elements, which are configured to provide mechanical support to the target substrate, such that when the target substrate moves over the one or more rotatable elements, at least one of the rotatable elements is configured to rotate in response to a physical contact with the target substrate.

The present invention will be more fully understood from the following detailed description of the embodiments thereof, taken together with the drawings in which:

DETAILED DESCRIPTION OF EMBODIMENTS

Overview

Some printing systems are designed to print images on one or both sides of a substrate, and subsequently, to convey the printed substrate to an output tray. It is important, particularly in two-sided printed substrates, to prevent surface damage, such as scratches, when conveying the substrate between printing processes and to the output tray.

Embodiments of the present invention that are described hereinbelow provide improved techniques for conveying a printed substrate in a printing machine, while eliminating or at least minimizing possible damage to the images printed on the substrate.

In some embodiments, a digital printing system comprises an intermediate transfer member (ITM) and a substrate conveyor. The ITM is configured to receive droplets of ink from an image forming station, so as to form an ink image on the ITM, and to transfer the ink image to a target substrate, such as a paper sheet. The substrate conveyor is configured to move the target substrate (e.g., a paper sheet) from the input stack, along the transfer station where the ink image is transferred from the ITM to the substrate, and to the output tray after concluding the image transfer to the paper sheet.

In some embodiments, the substrate conveyor comprises a moving gripper, which is configured to grip the paper sheet and move it along a perforated plate, which is coupled to a chain delivery of the printing system. In some embodiments, the substrate conveyor further comprises an array of rotatable elements, such as polytetrafluoroethylene (PTFE) balls, mounted on respective axes.

In some embodiments, the balls are fixed in openings of the perforated plate, such that the ball surface stands out of the plate surface and provides mechanical support to the paper sheet.

In some embodiments, when the gripper moves the paper sheet over the array, the balls are configured to rotate in response to a physical contact with a surface of the paper sheet facing the balls. Since there is only minimal friction between the balls and the paper sheet and the balls comprise ink repelling material, no damage is caused to the surface of the paper sheet being conveyed.

In some embodiments, both the chain delivery and the perforated plate may have a curved section, and the balls of the array are fitted along a respective curved surface of the plate. In these embodiments, when the gripper moves the paper sheet along the curved surface, the balls are configured to provide mechanical support and to rotate, without causing damage to the surface of the paper sheet.

The disclosed techniques improve the quality of printed substrates, and are particularly useful in preventing scratches in duplex printing, in which an images is printed on the substrate surface that is in physical contact with the substrate conveyor.

System Description

Figure 1:
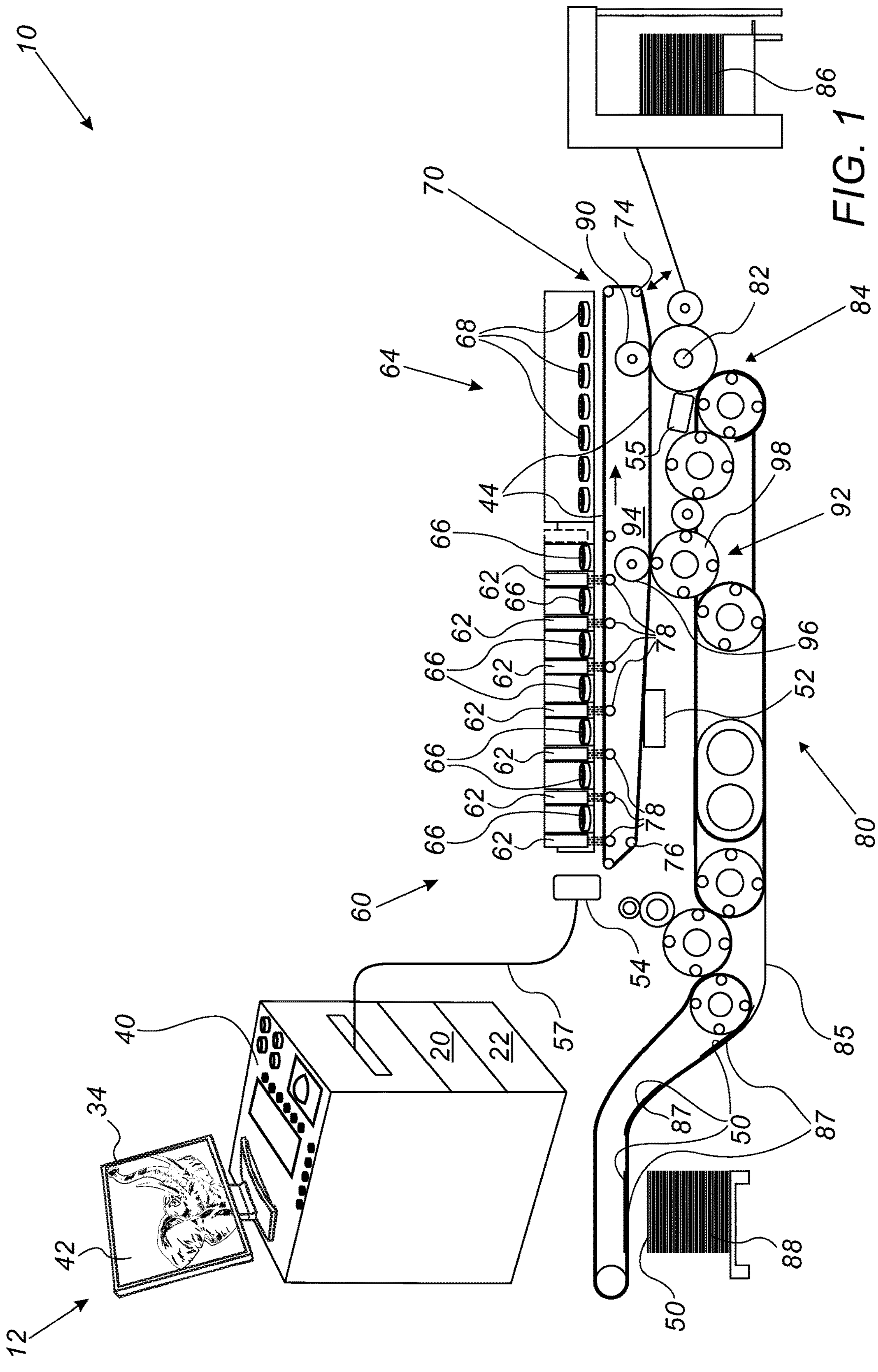
FIG. 1 is a schematic side view of a digital printing system, in accordance with an embodiment of the present invention.

FIG. 1 is a schematic side view of a digital printing system 10, in accordance with an embodiment of the present invention. In some embodiments, system 10 comprises a rolling flexible blanket 44 that cycles through an image forming station 60, a drying station 64, impression stations 84 and 92 and a blanket treatment station 52.

In the context of the present invention and in the claims, the terms "blanket" and "intermediate transfer member (ITM)" are used interchangeably and refer to a flexible member comprising one or more layers used as an intermediate member configured to receive an ink image and to transfer the ink image to a target substrate, as will be described in detail below.

In an operative mode, image forming station 60 is configured to form a mirror ink image, also referred to herein as "an ink image" (not shown), of a digital image 42 on an upper run of a surface of blanket 44. Subsequently the ink image is transferred to a target substrate, (e.g., a paper, a folding carton, or any suitable flexible package in a form of sheets or continuous web) located under a lower run of blanket 44.

In the context of the present disclosure and in the claims, the terms "ink image" and "image" are used interchangeably and refer to a printed image formed on blanket 44 and transferred to a target substrate.

In the context of the present invention, the term "run" refers to a length or segment of blanket 44 between any two given rollers over which blanket 44 is guided.

In some embodiments, during installation blanket 44 may be adhered (e.g., seamed) edge to edge to form a continuous blanket loop (not shown). An example of a method and a system for the installation of the seam is described in detail in U.S. Provisional Application 62/532,400, whose disclosure is incorporated herein by reference.

In some embodiments, image forming station 60 typically comprises multiple print bars 62, each mounted (e.g., using a slider) on a frame (not shown) positioned at a fixed height above the surface of the upper run of blanket 44. In some embodiments, each print bar 62 comprises a strip of print heads as wide as the printing area on blanket 44 and comprises individually controllable print nozzles.

In some embodiments, image forming station 60 may comprise any suitable number of bars 62, each bar 62 may contain a printing fluid, such as an aqueous ink of a different color. The ink typically has visible colors, such as but not limited to cyan, magenta, red, green, blue, yellow, black and white. In the example of FIG. 1, image forming station 60 comprises seven print bars 62, but may comprise, for example, four print bars 62 having any selected colors such as cyan, magenta, yellow and black.

In some embodiments, the print heads are configured to jet ink droplets of the different colors onto the surface of blanket 44 so as to form the ink image (not shown) on the surface of blanket 44.

In some embodiments, different print bars 62 are spaced from one another along the movement axis of blanket 44, represented by an arrow 94. In this configuration, accurate spacing between bars 62, and synchronization between directing the droplets of the ink of each bar 62 and moving blanket 44 are essential for enabling correct placement of the image pattern.

In some embodiments, system 10 comprises heaters, such as hot gas or air blowers 66, which are positioned in between print bars 62, and are configured to partially dry the ink droplets deposited on the surface of blanket 44.

This hot air flow between the print bars may assist, for example, in reducing condensation at the surface of the print heads and/or in handling satellites (e.g., residues or small droplets distributed around the main ink droplet), and/or in preventing blockage of the inkjet nozzles of the print heads, and/or in preventing the droplets of different color inks on blanket 44 from undesirably merging into one another. In some embodiments, system 10 comprises a drying station 64, configured to blow hot air (or another gas) onto the surface of blanket 44. In some embodiments, drying station comprises air blowers 68 or any other suitable drying apparatus.

In drying station 64, the ink image formed on blanket 44 is exposed to radiation and/or to hot air in order to dry the ink more thoroughly, evaporating most or all of the liquid carrier and leaving behind only a layer of resin and coloring agent which is heated to the point of being rendered tacky ink film.

In some embodiments, system 10 comprises a blanket transportation assembly 70, configured to move a rolling ITM, such as a blanket 44. In some embodiments, blanket transportation assembly 70 comprises one or more rollers 78, wherein at least one of rollers 78 comprises an encoder (not shown), which is configured to record the position of blanket 44, so as to control the position of a section of blanket 44 relative to a respective print bar 62. In some embodiments, the encoder of roller 78 typically comprises a rotary encoder configured to produce rotary-based position signals indicative of an angular displacement of the respective roller.

Additionally or alternatively, blanket 44 may comprise an integrated encoder (not shown) for controlling the operation of various modules of system 10. The integrated encoder is described in detail, for example, in U.S. Provisional Application 62/689,852, whose disclosure is incorporated herein by reference.

In some embodiments, blanket 44 is guided over rollers 76 and 78 and a powered tensioning roller, also referred to herein as a dancer 74. Dancer 74 is configured to control the length of slack in blanket 44 and its movement is schematically represented by a double sided arrow.

Furthermore, any stretching of blanket 44 with aging would not affect the ink image placement performance of system 10 and would merely require the taking up of more slack by tensioning dancer 74.

In some embodiments, dancer 74 may be motorized. The configuration and operation of rollers 76 and 78, and dancer 74 are described in further detail, for example, in U.S. Patent Application Publication 2017/0008272 and in the above-mentioned PCT International Publication WO 2013/132424, whose disclosures are all incorporated herein by reference.

In some embodiments, system 10 comprises an impression station 84, wherein blanket 44 passes between an impression cylinder 82 and a pressure cylinder 90, which is configured to carry a compressible blanket.

In some embodiments, system 10 comprises a control console 12, which is configured to control multiple modules and assemblies of system 10, such as blanket transportation assembly 70, image forming station 60 located above blanket transportation assembly 70, and a substrate conveyor 80 located below blanket transportation assembly 70 and described in detail below.

In some embodiments, console 12 comprises a processor 20, typically a general-purpose computer, with suitable front end and interface circuits for interfacing with a controller 54, via a cable 57, and for receiving signals therefrom. In some embodiments, controller 54, which is schematically shown as a single device, may comprise one or more electronic modules mounted on system 10 at predefined locations. At least one of the electronic modules of controller 54 may comprise an electronic device, such as control circuitry or a processor (not shown), which is configured to control various modules and stations of system 10.

In some embodiments, processor 20 and the control circuitry may be programmed in software to carry out the functions that are used by the printing system, and store data for the software in a memory 22. The software may be downloaded to processor 20 and to the control circuitry in electronic form, over a network, for example, or it may be provided on non-transitory tangible media, such as optical, magnetic or electronic memory media.

In some embodiments, console 12 comprises a display 34, which is configured to display data and images received from processor 20, or inputs inserted by a user (not shown) using input devices 40. The configuration of console 12 is provided by way of example and is simplified for the sake of conceptual clarity. In other embodiments, console 12 may have any other suitable configuration, for example, an alternative configuration of console 12 is described in detail in U.S. Pat. No. 9,229,664, whose disclosure is incorporated herein by reference.

In some embodiments, processor 20 is configured to display on display 34, digital image 42 having one or more segments (not shown) and, in some cases, various types of test patterns stored in memory 22.

In some embodiments, blanket treatment station 52, also referred to herein as a cooling station, is configured to treat the blanket by, for example, cooling it and/or applying a treatment fluid to the outer surface of blanket 44, and/or cleaning the outer surface of blanket 44. At blanket treatment station 52 the temperature of blanket 44 can be reduced to a desired value before blanket 44 enters image forming station 60. The treatment may be carried out by passing blanket 44 over one or more rollers or blades configured for applying cooling and/or cleaning and/or treatment fluid on the outer surface of the blanket.

In some embodiments, processor 20 is configured to receive, e.g., from temperature sensors (not shown), signals indicative of the surface temperature of blanket 44, so as to monitor the temperature of blanket 44 and to control the operation of blanket treatment station 52. Examples of such treatment stations are described, for example, in PCT International Publications WO 2013/132424 and WO 2017/208152, whose disclosures are all incorporated herein by reference. Additionally or alternatively, system 10 is configured to apply treatment fluid to the ITM by jetting or any other technique, prior to the ink jetting at the image forming station.

In the example of FIG. 1, station 52 is mounted between roller 78 and roller 76, yet, station 52 may be mounted adjacent to blanket 44 at any other suitable location between impression station 84 and image forming station 60.

In some embodiments, impression cylinder 82 of impression station 84, is configured to impress the ink image onto the target substrate, such as an individual sheet 50. In some embodiments, the target substrate may comprise any suitable substrate, such as but not limited to a flexible substrate, a partially flexible substrate (e.g., having flexible sections and rigid sections), or a rigid substrate.

In the example of FIG. 1, rollers 78 are positioned at the upper run of blanket 44 and are configured to maintain blanket 44 taut when passing adjacent to image forming station 60. Furthermore, it is particularly important to control the speed of blanket 44 below image forming station 60 so as to obtain accurate jetting and deposition of the ink droplets, thereby placement of the ink image, by forming station 60, on the surface of blanket 44.

In some embodiments, substrate conveyor 80 is configured to move sheet 50 from an input stack 86 to impression station 84 and additional stations of system 10 described below, and subsequently, to an output stack 88.

In some embodiments, the lower run of blanket 44 selectively interacts at impression station 84 with impression cylinder 82 to impress the image pattern onto the target substrate compressed between blanket 44 and impression cylinder 82 by the action of pressure of pressure cylinder 90. In the case of a simplex printer (i.e., printing on one side of sheet 50), only one impression station 84 is needed.

In some embodiments, system 10 comprises an additional impression station, such as an impression station 92, so as to permit duplex printing (i.e., printing on both sides of sheet In impression station 92, blanket 44 passes between an impression cylinder 98 and a pressure cylinder 96, as also shown in impression station 84 and described above.

In the context of the present disclosure and in the claims, the terms "duplex," "double-sided" and "perfecting" are used interchangeably and refer to any suitable technique of printing or assisting in printing of images on both sides of a substrate, such as sheet 50.

In some embodiments, substrate conveyor 80 is configured to move sheet 50 into impression station 84, which transfers a first ink image to a first surface of sheet 50. Subsequently, substrate conveyor 80 further comprises a perfecting unit (not shown), between the two impression stations 84 and 92, which is configured to flip and convey sheet 50 into impression station 92, so as to transfer a second ink image to a second surface of sheet 50, which is opposite to the first surface. This duplex printing may be applied to every sheet 50.

Alternatively, the duplex printing may be carried out using any other suitable process sequence, such as mixed lots of single and double-sided prints. For example, alternating simplex and duplex printing may be carried out in a batch comprising any suitable predefined number of sheets 50. In other words, substrate conveyor 80 is configured to move sheet 50 to and from blanket 44 for transferal of the ink image (e.g., between impression stations 84 and 92), and subsequently, to convey the printed sheets to output stack 88.

In some embodiments, the configuration of system 10 also enables conducting single sided prints at approximately twice the speed of printing double sided prints.

In alternative embodiments, a different configuration of substrate conveyor 80 may be used for printing on a continuous web substrate. Detailed descriptions and various configurations of sheet-fed simplex and duplex printing systems and of systems for printing on continuous web substrates are provided, for example, in U.S. Pat. Nos. 9,914,316 and 9,186,884, in PCT International Publication WO 2013/132424, in U.S. Patent Application Publication 2015/0054865, and in U.S. Provisional Application 62/596,926, whose disclosures are all incorporated herein by reference.

As briefly described above, sheets 50 or continuous web substrate (not shown) are carried by substrate conveyor 80 from input stack 86 and pass through the nip (not shown) located between impression cylinder 82 and pressure cylinder 90, and/or between impression cylinder 98 and pressure cylinder 96. Within the nip, the surface of blanket 44 carrying the ink image is pressed firmly, e.g., by compressible blanket (not shown), of pressure cylinder 90 against sheet 50 (or other suitable substrate) so that the ink image is impressed onto the surface of sheet 50 and separated neatly from the surface of blanket 44. As described above, after the simplex and/or duplex printing, sheet 50 is conveyed, by substrate conveyor 80, to output stack 88.

In some embodiments, substrate conveyor 80 comprises a chain delivery 85, in the example configuration of FIG. 1, chain delivery 85 is extended between input stack 86 and output stack 88, via impression stations 84 and 92. In some embodiments, substrate conveyor 80 further comprises one or more grippers 87, each of which is mounted along chain delivery 85 and is configured to grip and move a respective sheet 50 from input stack 86 along chain delivery 85. Each gripper 87 is configured to grip sheet 50 at one or more edges and to move the respective sheet 50 on flat and curved surfaces along chain delivery 85.

In some embodiments, system 10 comprises an image quality control station 55, also referred to herein as an automatic quality management (AQM) system, which serves as a closed loop inspection system integrated in system 10.

In some embodiments, station 55 may be positioned adjacent to impression cylinder 82, as shown in FIG. 1, and/or at any other suitable location in system 10.

In other embodiments, system 10 may comprise an additional image quality control station 55 (not shown) positioned adjacent to impression cylinder 98. The additional AQM system may be used for inspecting the ink image transferred, at impression station 92, to the second surface of sheet 50. In other words, system 10 may comprise one or more AQM systems, each of which may be used for inspecting the ink image transferred to one or both sides of sheet 50, by impression stations 84 and 92, respectively.

In some embodiments, station 55 comprises a camera (not shown), which is configured to acquire one or more digital images of the aforementioned ink image printed on sheet 50. In some embodiments, the camera may comprises any suitable image sensor, such as a Contact Image Sensor (CIS) or a Complementary metal oxide semiconductor (CMOS) image sensor, and a scanner comprising a slit having a width of about one meter or any other suitable width.

In some embodiments, station 55 may comprise a spectrophotometer (not shown) configured to monitor the quality of the ink printed on sheet 50.

In some embodiments, the digital images acquired by station 55 are transmitted to a processor, such as processor 20 or any other processor of station 55, which is configured to assess the quality of the respective printed images.

Based on the assessment and signals received from controller 54, processor 20 is configured to control the operation of the modules and stations of system 10. In the context of the present invention and in the claims, the term "processor" refers to any processing unit, such as processor 20 or any other processor connected to or integrated with station 55, which is configured to process signals received from the camera and/or the spectrophotometer of station 55.

In some embodiments, the signal processing operations, control-related instructions, and other computational operations described herein may be carried out by a single processor, or shared between multiple processors of one or more respective computers.

In some embodiments, station 55 is configured to inspect the quality of the printed images and test pattern so as to monitor various attributes, such as but not limited to image distortions, mechanical damage to the surface of the printed image, full image registration with sheet 50, color-to-color registration, printed geometry, image uniformity, profile and linearity of colors, and functionality of the print nozzles.

In some embodiments, processor 20 is configured to automatically detect, based on images acquired by station 55, errors and defects, such as scratch or particles, occurred during the mechanical handling of sheets 50. For example, one or more AQM stations may be positioned along the transport path of sheets 50 carried out by substrate conveyor 80.

Additionally or alternatively, processor 20 is configured to automatically detect geometrical distortions or other errors in one or more of the aforementioned attributes. For example, processor 20 is configured to compare between a design version of a given digital image and a digital image of the printed version of the given image, which is acquired by the camera.

In other embodiments, processor 20 may apply any suitable type image processing software, e.g., to reference sheet 50 and/or to a test pattern, for detecting distortions indicative of the aforementioned errors. In some embodiments, processor 20 is configured to analyze the detected distortion in order to apply a corrective action to the malfunctioning module, and/or to feed instructions to another module or station of system 10, so as to compensate for the detected distortion.

In some embodiments, by acquiring images of sheet 50, station 55 is configured to measure various types of the defects, distortions and errors described above, and mechanical scratch and front-to-back registration errors that may occur in duplex printing. In some embodiments, processor 20 is configured to: (i) sort out, e.g., to a rejection tray (shown in FIG. 2A below), sheets 50 having a mechanical scratch or a distortion above a first predefined set of thresholds, (ii) initiate corrective actions for sheets 50 having the mechanical scratch or distortion above a second, lower, predefined set of thresholds, and (iii) output sheets 50 having minor distortions, e.g., below the second set of thresholds, to output stack 88.

In some embodiments, processor 20 is configured to detect, based on the signals acquired by station 55, various types of defects: (i) in the substrate (e.g., blanket 44 and/or sheet 50), such as mechanical damage, a pin hole, and a broken edge, and (ii) printing-related defects, such as irregular color spots, satellites, and splashes.

In some embodiments, processor 20 is configured to detect these defects by comparing between a section of the printed and a respective reference section of the original design, also referred to herein as a master. Processor 20 is further configured to classify the defects, and, based on the classification and predefined criteria, to reject sheets 50 having defects that are not within the specified predefined criteria.

In some embodiments, the processor of station 55 is configured to decide whether to stop the operation of system 10, for example, in case the defect density is above a specified threshold. The processor of station 55 is further configured to initiate a corrective action in one or more of the modules and stations of system 10, as described above.

The corrective action may be carried out on-the-fly (while system 10 continue the printing process), or offline, by stopping the printing operation and fixing the problem in a respective modules and/or station of system 10. In other embodiments, any other processor or controller of system 10 (e.g., processor 20 or controller 54) is configured to start a corrective action or to stop the operation of system 10 in case the defect density is above a specified threshold.

Additionally or alternatively, processor 20 is configured to receive, e.g., from station 55, signals indicative of additional types of defects and problems in the printing process of system 10. Based on these signals processor 20 is configured to automatically estimate the level of pattern placement accuracy and additional types of defects not mentioned above.

In other embodiments, any other suitable method for examining the pattern printed on sheets 50 (or on any other substrate described above), can also be used, for example, using an external (e.g., offline) inspection system, or any type of measurements jig and/or scanner. In these embodiments, based on information received from the external inspection system, processor 20 is configured to initiate any suitable corrective action and/or to stop the operation of system 10.

The configuration of system 10 is simplified and provided purely by way of example for the sake of clarifying the present invention. The components, modules and stations described in printing system 10 hereinabove and additional components and configurations are described in detail, for example, in U.S. Pat. Nos. 9,327,496 and 9,186,884, in PCT International Publications WO 2013/132438, WO 2013/132424 and WO 2017/208152, in U.S. Patent Application Publications 2015/0118503 and 2017/0008272, whose disclosures are all incorporated herein by reference.

The particular configurations of system 10 are shown by way of example, in order to illustrate certain problems that are addressed by embodiments of the present invention and to demonstrate the application of these embodiments in enhancing the performance of such systems. Embodiments of the present invention, however, are by no means limited to this specific sort of example systems, and the principles described herein may similarly be applied to any other sorts of printing systems.

Figure 2A:
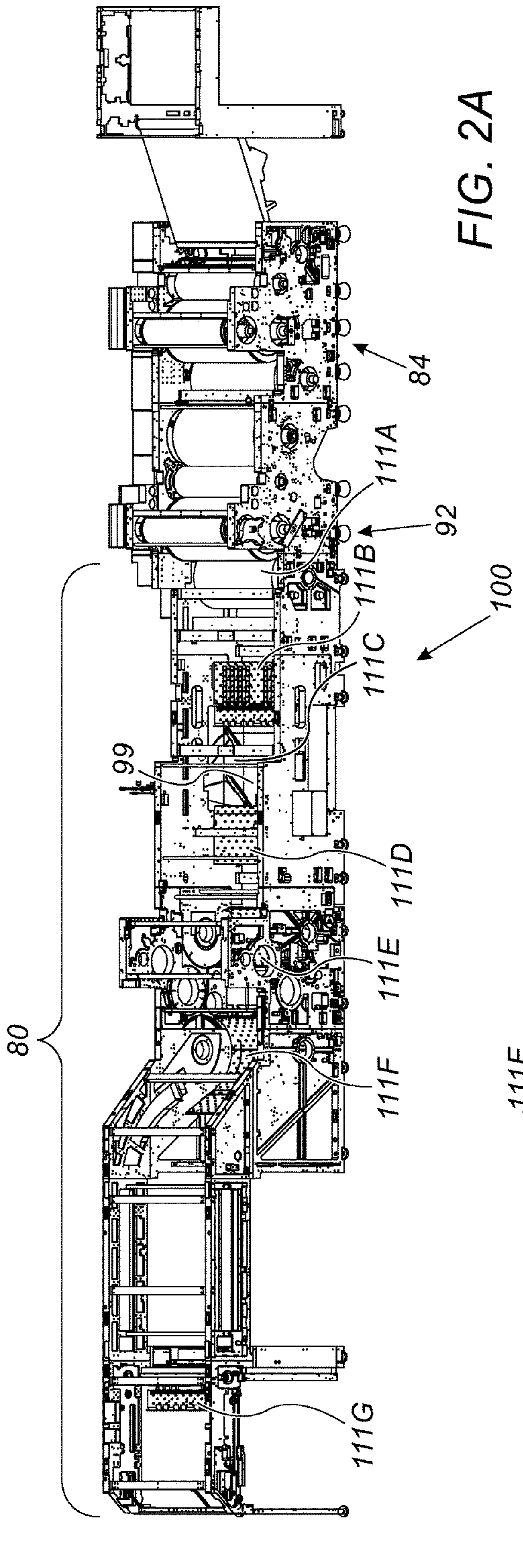
FIG. 2A is a schematic, pictorial illustration of a substrate transport assembly mounted on a substrate conveyor of a digital printing system, in accordance with an embodiment of the present invention.

A Substrate Transport Assembly Comprising Rotatable Balls for Preventing Scratches in a Printed Sheet FIG. 2A is a schematic, pictorial illustration of a substrate transport assembly 100 mounted on substrate conveyor 80, in accordance with an embodiment of the present invention. As described in FIG. 1 above, substrate conveyor 80 is configured to convey sheets 50 between input stack 86 and output stack 88, via impression stations 84 and 92, and optionally to sort out rejected sheets 50 to a rejection tray 99 of system 10. Sheets 50 may have the ink image printed on one surface, or on two surfaces as described in detail in FIG. 1 above.

In some embodiments, substrate transport assembly 100 comprises one or more arrays of rotatable elements, shown in FIG. 2B below, fixed in respective plates described in detail below. The plates are mounted on chain delivery 85, at predefined positions along substrate conveyor 80. The arrays of rotatable elements are configured to provide mechanical support to sheets 50 and, when gripper 87 moves sheets 50 over the array, one or more of the rotatable elements are configured to rotate in response to a physical contact with sheet 50. Note that the rotatable elements are not moving relative to, and have a minimal friction with, sheet 50.

In some embodiments, the plates having the fixed arrays of rotatable elements, are configured to conform to the shape of the respective positions and/or sections of chain delivery 85 to which they are fixed. Additionally or alternatively, the plates having the fixed arrays of rotatable elements are configured to conform to the shape of respective sections of substrate conveyor 80.

In some embodiments, the rotatable elements comprise ink-repellent materials, such as polytetrafluoroethylene (PTFE) or other suitable Teflon™-based materials, which are configured to prevent a mechanical damage, such as scratch, at the printed surface of sheet 50 facing the rotatable elements.

In some embodiments, the arrays of rotatable elements may comprise balls, rollers, bearing, any suitable combination thereof, or any other suitable type of rotatable elements, and are described in detail below.

In the example of FIG. 2A, substrate transport assembly 100 comprises multiple perforated plates 111A-111G, such that the arrays of rotatable elements are fitted in openings of respective plates 111A-111G. In some embodiments, the perforated plates are coupled to chain delivery 85 and are typically not moving. Therefore, when gripper 87 moves sheets 50 over plates 111A-111G, sheets 50 are hovering over the perforated plates and are making physical contact only with the surface of the rotatable elements that are fixed in plates 111A-111G and are rotatable along the moving direction of sheet 50. Note that plate 111A is located below a drum adjacent to impression station 92, and therefore hidden in FIG. 2A, but is shown in detail in FIG. 2B below.

In some embodiments, perforated plate 111C is positioned between the path of sheet 50 and rejection tray 99. In case the printing process does not involve sheet rejection, plate 111C remains between the path of sheet 50 and rejection tray 99. In case the printing process involves sheet rejection, plate 111C may be removed from the configuration of system 10.

In alternative embodiments, perforated plate 111C is configured to move so as to sort out a rejected sheet 50 into rejection tray 99.

In some embodiments, plate 111G is mounted in close proximity to output stack 88 so as to prevent scratches on printed sheets 50.

In an embodiment, sheets 50 may have a typical length between 520 mm and 1050 mm, and a typical width between 360 mm and 750 mm, but in other embodiments, system 10 may print ink images on sheets having any other suitable length and width. Moreover, system 10 is configured to print ink images on substrates having any other shape and size. In some embodiments, plate 111B is configured to move along X-axis (e.g., a few mm) so as to close a gap between plates 111B and 111C, that otherwise, may result in loss of short sheets that may fall between plates 111B and 111C.

Figure 2B:
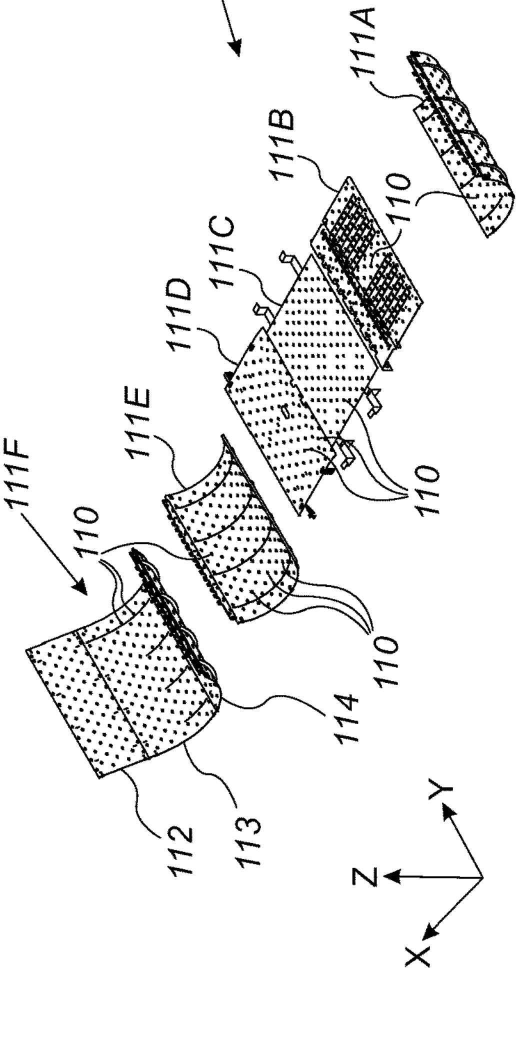
FIG. 2B is a schematic, pictorial illustration of plates of a substrate transport assembly, in accordance with an embodiment of the present invention.

FIG. 2B is a schematic, pictorial illustration of plates 111A-111F of substrate transport assembly 100, in accordance with an embodiment of the present invention. In some embodiments, substrate transport assembly 100 comprises flat plates, such as plates 111B, 111C, 111D (and plate 111G shown in FIG. 2A above), and curved plates, such as plates 111E, 111E and 111F.

In some embodiments, plates 111A-111G may comprise any suitable material, such as an aluminum alloy (e.g., H32 5052) and may have any suitable dimensions. For example, a thickness of about 2 mm enables shaping the plate to any suitable radius of curvature, and yet, retains the plate durability, so that the preformed shape of the curved surface is not distorted by the high volume (e.g., millions) of sheets 50 conveyed by substrate conveyor 80 over time.

In some embodiments, plates 111A-111G may have any suitable width and length. For example, a width of about 50 cm, which is similar to the width of chain delivery 85, and an exemplary length of about 1 meter. Note that the aforementioned dimensions are provided by way of example, and the actual dimensions of each plate 111A-111G are designed to cover areas, along substrate conveyor 80, that may cause mechanical damage (e.g., scratch) to the surface of sheet 50 facing the plates.

In some embodiments, each of perforated plates 111A-111G has multiple rotatable elements 110 assembled in respective openings of the plates. The assembly of rotatable elements 110 may be carried out by mounting each element 110 on an axis, in a process sequence shown in FIG. 3 below, or on an array of balls, or using any other suitable technique. For example, each of plates 111A-111G may have an array of PTFE balls having a diameter of about 10 mm, each ball fitted in a respective 11 mm square opening of the perforated plate. The array of balls may have any suitable pitch size, such as 50 mm.

In other embodiments, the rotatable elements may comprise rollers having any suitable diameter, e.g., about 10 mm, and any suitable width, e.g., about 15 mm. In these embodiments, the plate may have rectangular openings of about 11 mm in X-axis and 16 mm in Y-axis, and the rollers are fitted in the openings so that each roller rotates about Y-axis in order to move sheet 50 along X-axis.

The configurations of openings and rotatable elements described above are provided by way of example for the sake of conceptual clarity. In other embodiments, each of plates 111A-111G may have any other suitable configuration, having any suitable one or more types of rotatable elements arranged in one or more arrays having any suitable dimensions.

In some embodiments, the surfaces of rotatable elements 110 (e.g., balls) in physical contact with the balls, are fitted along a curved surface, which is parallel to the curved surface of the respective curved plate. In other words, the plates and/or balls mounted on respective axes are shaped to fit any desired radius of curvature or other shapes of the surfaces they are designed to support. Moreover, in such embodiments, the one or more arrays of rotatable elements 110 are configured to conform to any shape of substrate conveyor 80 or to any shape of any other substrate conveyor.

In some embodiments, gripper 87 is configured to move sheet 50 along the curved surface, such that the balls of the array are arranged to provide sheet 50 with mechanical support along the curved surface, without sufficient friction that may scratch the surface of sheet 50.

In some embodiments, the plates of substrate transport assembly 100 may be an integrated in the configuration of system 10, e.g., during the production and installation of system 10 at a printing facility. Additionally or alternatively, at least one of plates 111A-111G, or substrate transport assembly 100 as a whole, may be installed after the assembly and installation system 10, as an upgrade kit also referred to herein as an add-on kit, so as to eliminate or at least substantially reduce, mechanical damage at the surface of sheet 50 that makes physical contact with the parts of substrate conveyor 80.

In the example configuration of FIG. 2B, the curved plates have a concave shape. In other embodiments, at least one of the plates may have any suitable shape, such as but not limited to, convex, concave and a combination thereof.

In some embodiments, at least one of the plates may comprise an assembly of multiple plates coupled to one another. For example, plate 111F may comprise a flat plate 112 and two curved plates 113 and 114 having mutually different radius of curvature.

This particular configuration of plates 111A-111G is shown by way of example, in order to illustrate certain problems, such as scratching images printed on sheets 50, that are addressed by embodiments of the present invention and to demonstrate the application of these embodiments in enhancing the performance of system 10. Embodiments of the present invention, however, are by no means limited to this specific sort of example system, plates and arrays of rotatable elements, and the principles described herein may similarly be applied to other sorts of printing systems and other configurations of rotatable elements configured to prevent mechanical damage to the surface of sheets 50 of any other types of target substrates.

Assembling Balls in Array of Rotatable Elements

Figure 3:
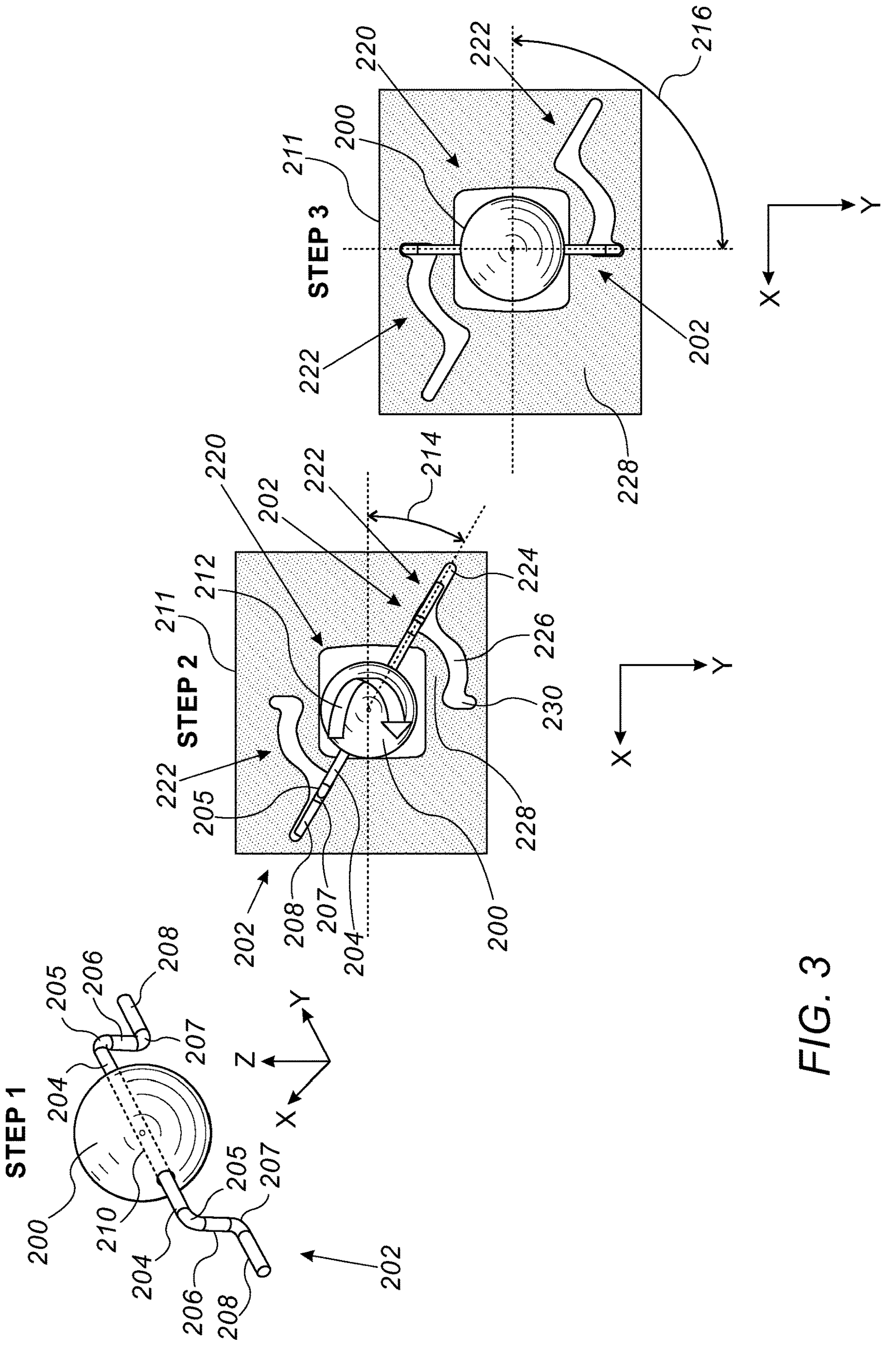
FIG. 3 is a diagram that schematically illustrates a process sequence for assembling a rotatable ball into an array of rotatable elements, in accordance with an embodiment of the present invention.

FIG. 3 is a diagram that schematically illustrates a process sequence for assembling a rotatable ball 200 into an array of rotatable elements, in accordance with an embodiment of the present invention. In some embodiments, ball 200 is made from or coated with PTFE or other suitable materials, such as but not limited to other Teflon™-based materials, and may replace any of rotatable elements 110 shown in FIG. 2B above.

The assembly process begins at a step 1 with producing and threading an axis 202 through a channel 210 preformed along the diameter of ball 200. In some embodiments, axis 202 comprises a wire comprising any suitable material, such as a suitable alloy of stainless steel, having an exemplary diameter of about 1 mm and an exemplary length of about 30 mm.

In some embodiments, axis 202 may be threaded through channel 210 along Y-axis, and then bended to form two horizontal sections 204 and 208 along Y-axis, a vertical section 206 along Z-axis, and two knees 205 and 207 coupling between the vertical and horizontal sections. At least one of the threading and bending processes may be carried out using a suitable production machine.

In an embodiment, channel 210 and axis 202 are sized and shaped to fit snugly over one another, so as to enable easy threading of axis 202 into channel 210, and yet, to prevent any lateral motion of section 204 along X and Z axes of channel 210. Moreover, ball 200 and axis 202 are made from suitable materials selected to have minimal mutual friction when section 204 rotates about Y-axis, within channel 210.

Reference is now made to a step 2, which is a top-view of ball 200 and axis 202 in XY-plane. At step 2, ball 200 and axis 202 are fitted into respective openings 220 and 222 preformed in a plate 211, which corresponds to and may replace any of plates 111A-111G described in FIG. 2B above. In the example of FIG. 3, opening 220 has an 11 mm square shape as described above, and each of openings 222 comprises three connected slots 224, 226 and 230.

In some embodiments, sections 206-208 of axis 202 are inserted into slot 224 of opening 222, at an insertion angle 214 relative to X-axis. Note that section 204 of axis 202 is positioned above a top surface 228 of plate 211 so as to position the surface of ball 200 above surface 228 of plate 211. In other words, the upper surface of ball 200 stands out of top surface 228 of plate 211, so as to mechanically support sheet 50 and to prevent physical contact between sheet 50 and any surface of plate 211.

In the context of the present invention and in the claims, slot 224 is also referred to herein as an insertion slot, slot 226 is also referred to herein as a rotation slot, and slot 230 is also referred to herein as a locking slot.

In some embodiments, after inserting sections 206-208 of axis 202 into slot 224, ball 200 and axis 202 are rotated clockwise in XY-plane as shown by axis 212. The rotation operation may be carried out manually or using a suitable rotation apparatus, and the rotation direction (e.g., clockwise or counterclockwise) depends on the configuration and shape of opening 222.

In some embodiments, during the rotation, section 204 is positioned above top surface 228, as described above, section 206 is rotated clockwise through slot 226, and section 208 rotates below the bottom surface (not shown) of plate 211.

Reference is now made to a step 3, which is a top-view of ball 200 and plate 211 in XY-plane. At step 3, axis 202 completes the rotation at a locking angle 216 through slot 226 and is being locked by slot 230, at a locking position. In the example of FIG. 3, locking angle 216 extends between X-axis and the extension of axis 202. Note that at the locking position, axis 202 is parallel to, and configured to rotate about, Y-axis. In other words, axis 202 is perpendicular to X-axis, which is the moving direction of sheet 50 as described above.

In some embodiments, at the locking position, ball 200 is configured to rotate about Y-axis such that the surface of ball 200 move along X-axis, in response to a physical contact with sheet 50 that is being moved by gripper 87 along X-axis, as described in FIG. 2A above.

As described in steps 2 and 3 above, slots 224, 226 and 230 of plate 211 are configured to receive axis 202 at insertion angle 214 and to lock axis 202 at locking angle 216, which is different from insertion angle 214.

This particular configuration of axis 202 and slots 224, 226 and 230 are shown by way of example, in order to illustrate certain problems of positioning and fixing ball 200, or any other suitable rotatable element, in any suitable array or plate. These problems are addressed by embodiments of the present invention and demonstrate the application of these embodiments in enhancing the performance of system 10. Embodiments of the present invention, however, are by no means limited to this specific sort of example positioning and fixing apparatus, and the principles described herein may similarly be applied to other configurations for positioning and fixing rotatable elements in plates or other sorts of arrays.

Figure 4A:
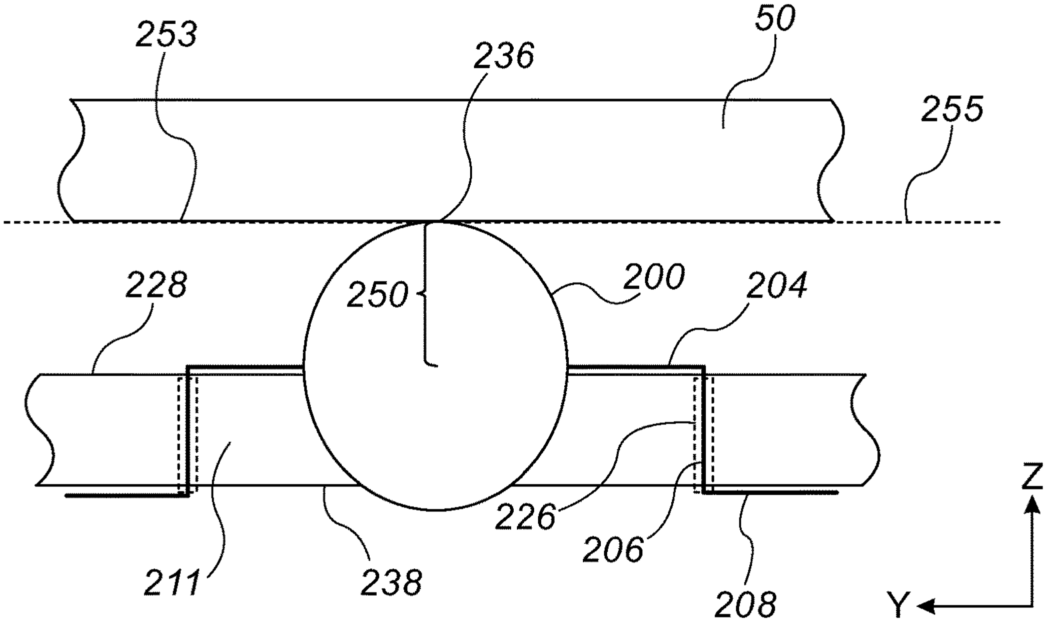
FIGS. 4A and 4B are schematic side views of a rotatable ball and an axis fixed in a plate, in accordance with embodiments of the present invention.

Techniques for Locking the Ball Movement Along the Y and Z Axes at the Locking Position FIG. 4A is a schematic sectional view of ball 200 and axis 202 fixed in plate 211 in Y and Z axes, in accordance with an embodiment of the present invention.

As described above, at step 3 of FIG. 3, axis 202 is locked by slot 230, such that ball 200 is configured to rotate about Y-axis in response to a physical contact with a surface 253 of sheet 50 that is being moved along X-axis by gripper 87.

In some embodiments, section 204 of axis 202 is mounted above surface 228 of plate 211, and is configured to enable rotation of ball 200 about Y-axis, such that a surface 236 of ball 200 provides mechanical support to sheet 50 at a distance 250 from surface 228. In the example configuration of FIG. 4A, distance 250 is sufficiently large (e.g., about 5.5 mm) to prevent surface 253 of sheet 50 from making physical contact with surface 228, even between two adjacent balls 200 or at the edge of plate 211.

In some embodiments, a virtual plane, also referred to herein as a surface 255, which is substantially parallel to surface 253 of sheet 50, is formed by a virtual web of lines that connect between the top prats of surfaces 236 of all the balls mounted on substrate 211. In some embodiments, sheet 50 is moved along surface 255 at a distance of about 5.5 mm from surface 228 of plate 211.

As described in FIG. 2B above, system 10 may comprise one or more curved plates, such as plate 111A, having an array of rotatable elements, such as balls 200, fixed along the curved surface of the plate.

In some embodiments, surface 228 of plate 211 may have a curved shape, such that balls 200 that are fitted in surface 228, are configured to form a curved surface 255. In these embodiments, gripper 87 of system 10 is configured to move sheet 50 along curved surface 255, such that sheet 50 hovers over surface 228 without making physical contact therewith.

In some embodiments, openings 222 are configured to lock axis 202 from moving along Y-axis, by slot 226 that surrounds section 206. Moreover, sections 204 and 208 are positioned, respectively, above and below surfaces 228 and 238 of plate 211, and therefore, axis 202 cannot move along Z-axis.

Enabling Ball Rotation About the Y-Axis at the Locking Position

Figure 4B:
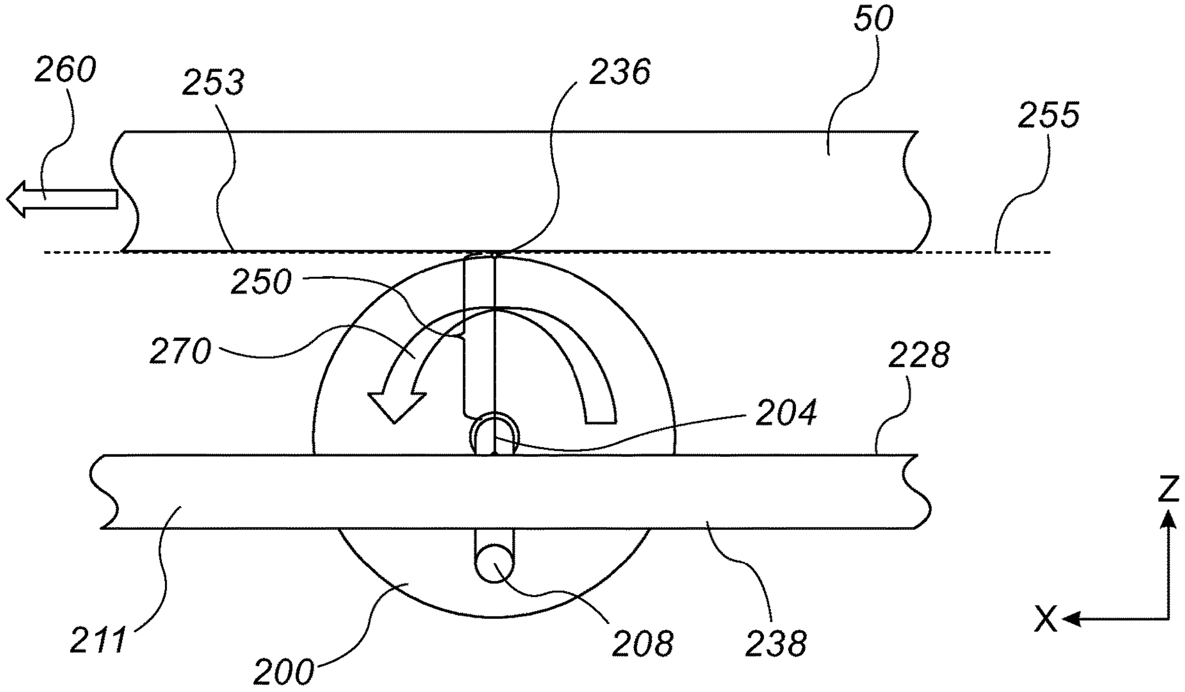

FIG. 4B is a schematic side view of ball 200 and axis 202 fixed in plate 211, in accordance with an embodiment of the present invention. As described above, gripper 87 of system 10 moves sheet 50 in a direction 260 parallel to X-axis, and makes physical contact with surface 236 of ball 200.

In some embodiments, ball 200 is configured to rotate about section 204, which is oriented in parallel to the Y-axis. Rotation of the ball is caused due to the physical contact of the ball surface with sheet 50, as shown by an arrow 270. Note that the kinetic energy of a moving ball 200 is received solely from sheet 50, and therefore the ball remains motionless when sheet 50 stands still on top of surface 236. In other words, balls 200 that are made from PTFE, at least in part, are passive and are rotated only by the movement of sheet 50. Therefore, balls 200 are configured to mechanically support sheet 50 without scratching ink images produced by system 10 on surface 253 of sheet 50.

In some embodiments, at the locking position, ball 200 does not rotate in response to any undesired move of sheet 50 along Y-axis and/or Z-axis. Therefore, ball 200 provides mechanical support to sheet 50 and may resist to motion of sheet 50 at any direction other than parallel to X-axis.

Array of Rotatable Elements Mounted on a Frame

Figure 5:
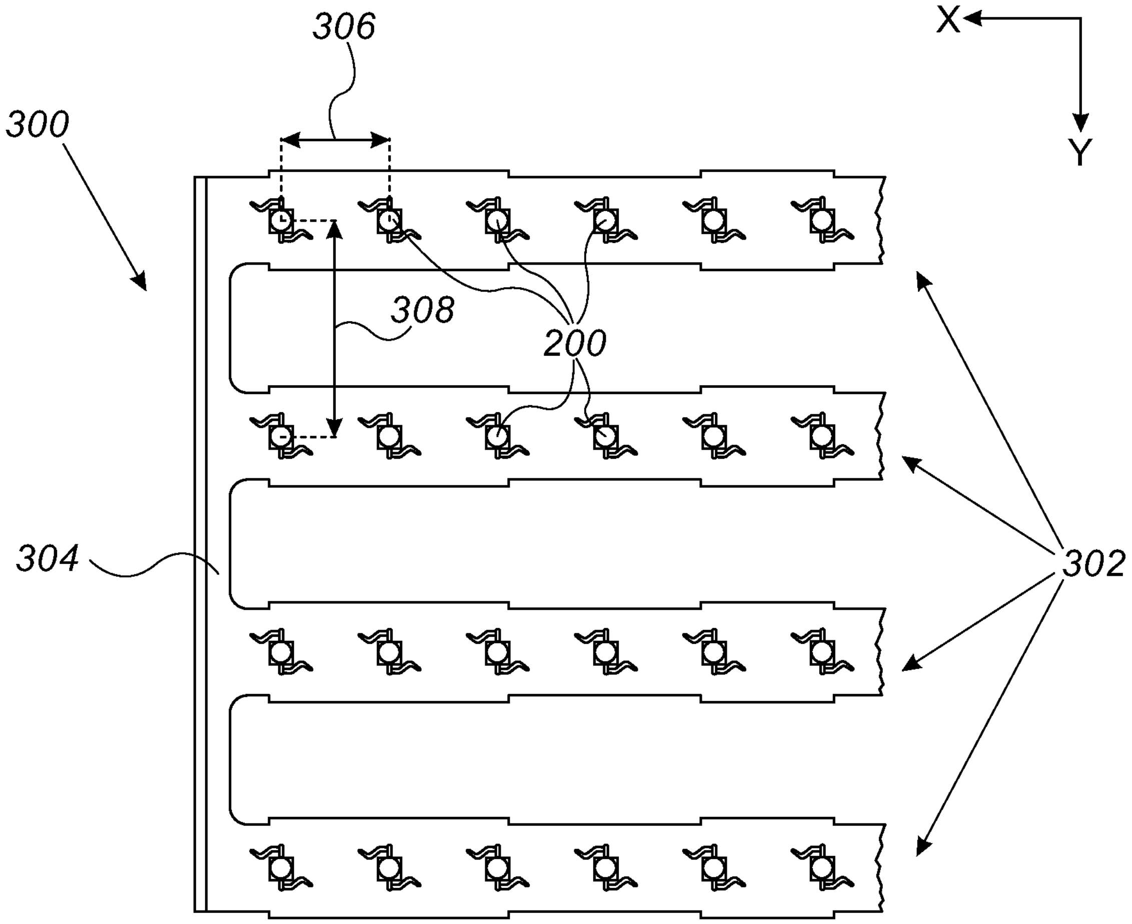
FIG. 5 is a schematic, pictorial illustration of rotatable balls. mounted on a frame, in accordance with another embodiment of the present invention.

FIG. 5 is a schematic, pictorial illustration of balls 200 mounted on a frame 300, in accordance with another embodiment of the present invention. Frame 300 may replace at least one of plates 111B, 111C and 111D shown in FIGS. 2A and 2B above.

In some embodiments, frame 300 comprises a bar 304 positioned along the Y-axis, to which multiple arms 302 are coupled and extended from bar 304 along the X-axis.

In some embodiments, each of arms 302 has multiple openings 220 and 222, perforated at a predefined distance 306 from one another. As described in FIG. 3 above, openings 220 and 222 may be used for fixing balls 200 during the production and/or field-implementation of frame 300 in system 10. As further described in FIG. 3 above, each ball 200 has a separate axis 202, and as shown in FIG. 5, all axes are aligned along at least one of X and Y axes. Moreover, at least two axes 202, and typically all axes 202 in the array of perforated plates of FIG. 2B above and in the array of frame 300 of FIG. 5, are positioned in parallel to one another along Y-axis, which is orthogonal to the movement direction of sheet 50 along X-axis.

In some embodiments, the distance between arms 302 and the position of openings 220 and 222 in the arms, determine a distance 308 between balls 200 fixed in adjacent arms 302. In the example of FIG. 5, distance 308 appears larger than distance 306, yet, in other embodiments, balls 200 may be arranged in any other configuration so as to set similar or different distances between balls 200 along X and Y axes.

In alternative embodiments, at least some of balls 200 may be replaced by any other suitable type of rotatable elements, such as but not limited to rollers and/or bearing. In these embodiments, frame 300 may comprise one or more types of rotatable elements arranged in any suitable configuration.

The configuration of frame 300 is provided by way of example, and is simplified for the sake of conceptual clarity. In other embodiments, frame 300 may comprise an array of axes arranged in any suitable configuration. For example, rods having embedded rotatable elements may be arranged in rows and columns in a crisscross configuration along any suitable axes, such as X and Y axes. In this configuration the usage of plate described, for example, in FIG. 2B above, and of the bar and arms described in FIG. 5 may be omitted. Additionally or alternatively, in an array of balls, at least one row of balls may be replaced by a row of cylinders or any other suitable type of rotatable elements.

In another embodiment, a single axis may be shared by two or more rotatable elements (e.g., balls, cylinders, or a combination thereof), as will be depicted in detail in FIG. 6 below. In response to a physical contact with sheet 50, one or more of the aforementioned rotatable elements may rotate about Y-axis, and therefore, enable movement of sheet 50, with a minimal friction, along X-axis, as described above.

In some embodiments, the disclosed techniques may be used for coupling any printed substrate, such as sheet 50, to any substrate conveyor at any suitable location along the path of a printing system. For example, a perforated plate having a structure similar to perforated plate 111E, may be used for tightening sheet 50 to impression cylinder 82, so as to improve the image acquisition process by image quality control station 55. Additionally or alternatively, the above-described perforated plates with rotatable elements may be used at any suitable location along substrate transport assembly 100, so as to prevent undesired friction and damage to the ink image printed on the surface of sheet 50, which is facing substrate transport assembly 100.

In some embodiments, the techniques disclosed in the present invention may be used, mutatis mutandis, for preventing surface damage to any object transported by a conveying system on any surface.

The configuration of substrate transport assembly 100 is provided by way of example, for demonstrating an example printing system in which substrate transport assembly 100 may be integrated and used. Additionally or alternatively, any other suitable configurations can also be used in any other type of system conveying a substrate. For example, (a) substrate transport assembly 100 may be implemented in a system for printing directly on both sides of a target substrate (e.g., ink-jetting on sheets and/or continuous web substrates), (b) a different configuration of the substrate transport assembly may comprise a rotatable surface which is not limited to a plurality of rotatable elements. For example, a single-piece body (or a multi-piece body) providing system 10 (or any other system) with the same functionality of the rotatable elements (e.g., rotatable elements 110 and/or balls 200).

In some embodiments, in the case of the direct printing system of example "(a)" described in the previous paragraph, the system may comprise an image forming station, which is configured to apply droplets of one or more printing fluids (e.g., inks) to the target substrate, so as to form the image thereon. Such system may not have a blanket or any other sort of ITM, and the substrate conveyor may have the same configuration and/or functionality of substrate transport assembly 100 described above, or any other suitable configuration.

Figure 6:
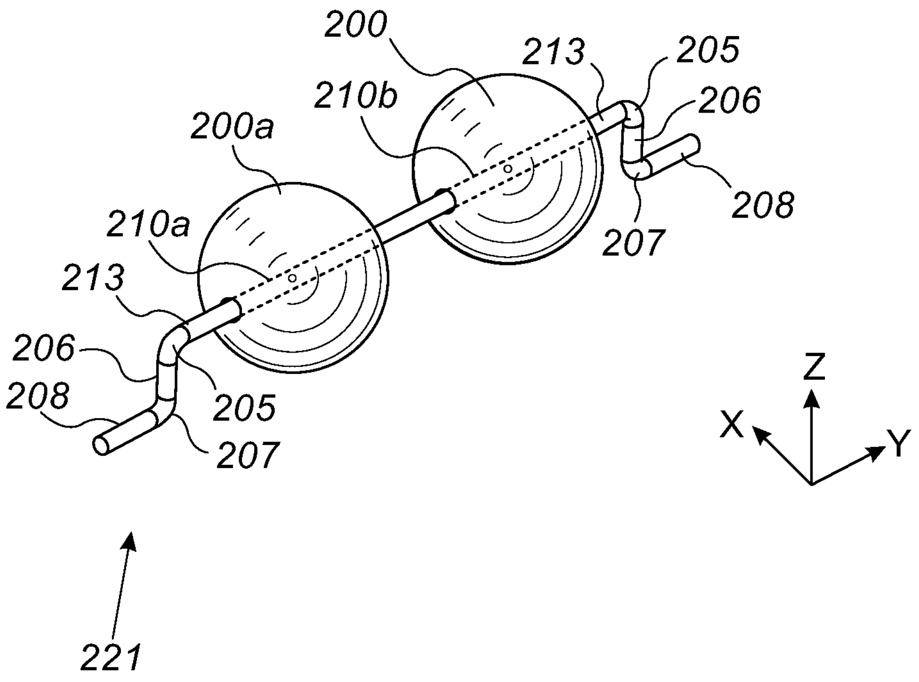
FIG. 6 is a schematic, pictorial illustration of multiple rotatable balls assembled on a wire into the array of rotatable elements, in accordance with an embodiment of the present invention.

FIG. 6 is a schematic, pictorial illustration of rotatable balls 200*a* and 200*b* assembled on a wire 221 into the array of rotatable elements, in accordance with an embodiment of the present invention.

In some embodiments, balls 200*a* and 200*b* have channels 210*a* and 210*b*, respectively. As such, wire 221 may be threaded through channels 210*a* and 210*b* along Y-axis, and then bended to form (i) two horizontal sections 213 and 208 along Y-axis, (ii) a vertical section 206 along Z-axis, and (iii) two knees 205 and 207 coupling between the vertical and horizontal sections. It is noted that the configuration of FIG. 6 is similar to that of step 1 of FIG. 3 above, but in the example of FIG. 6, wire 221, which is a single wire, is shared by two or more rotatable elements. In the present example, the two or more rotatable elements comprise balls 200*a* and 200*b*, but in other embodiments, the two or more rotatable elements may comprise any other suitable type of rotatable elements, such as cylinders, or a combination of balls and cylinders, as described in step 1 of FIG. 3 above. Moreover, the assembly of balls 200*a* and 200*b* and wire 221, is carried out using the technique described in steps 2 and 3 of FIG. 3 above.

In an embodiment, channel 210*a* and 210*b*, and wire 221 are sized and shaped to fit snugly over one another, to enable easy threading wire 221 into channels 210*a* and 210*b*, and yet, to prevent any lateral motion of section 213 along X and Z axes of channels 210*a* and/or 210*b*. Moreover, balls 200*a* and 200*b*, and wire 221 are made from suitable materials selected to have minimal mutual friction when section 213 rotates about Y-axis, within channels 210*a* and 210*b*.

Although the embodiments described herein mainly address digital printing systems, the methods and systems described herein can also be used in other applications, such as in any type of printing systems (as described above) or any other type of system configured for conveying one or more substrates without damaging the surface thereof. It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A system, comprising:

an image forming station, which is configured to apply droplets of one or more printing fluids to a target substrate, so as to form an image thereon; and a substrate conveyor, which comprises one or more perforated plates having multiple openings, and is configured to grip and move the target substrate to and from the image forming station for forming the image, the substrate conveyor comprising one or more rotatable elements, which are fitted in the respective openings, and are configured to provide mechanical support to the target substrate, wherein, when the target substrate moves over the one or more rotatable elements, at least one of the rotatable elements is configured to rotate in response to a physical contact with the target substrate by receiving a kinetic energy from the target substrate, wherein at least one of the perforated plates comprises (i) a bar positioned along a first axis, and (ii) at least first and second arms that are coupled to and extended from the bar along a second axis, different from the first axis.

2. The system according to claim 1, wherein the one or more perforated plates comprise a first perforated plate, which is flat, and a second perforated plate, which is curved.

3. The system according to claim 1, wherein the first axis or the second axis is parallel to a movement direction of the target substrate.

4. The system according to claim 1, wherein the first and second arms are positioned (i) parallel to one another along the second axis, and (ii) at a first distance from one another along the first axis.

5. The system according to claim 4, wherein the openings are arranged in at least one of the first and second arms along the second axis at a second distance from one another, and wherein the rotatable elements are fitted in the opening at the second distance from one another.

6. The system according to claim 5, wherein the first distance is different from the second distance.

7. The system according to claim 1, wherein one or more of the rotatable elements are mounted on a wire, and wherein at least one of the perforated plates comprises one or more slots, which are configured to receive the wire at a first angle and to lock the wire at a second angle, different from the first angle.

8. The system according to claim 1, wherein at least one of the rotatable elements comprises a ball.

9. The system according to claim 1, wherein at least one of the rotatable elements comprises at least a roller or a bearing.

10. A method, comprising:

providing multiple rotatable elements for mechanically supporting a target substrate, wherein, when the target substrate moves over the multiple rotatable elements, at least one of the rotatable elements rotates in response to a physical contact with the target substrate by receiving a kinetic energy from the target substrate; and fixing the multiple rotatable elements at multiple respective positions of a mounting element, and assembling the mounting element to a substrate conveyor of a digital printing system, wherein assembling the mounting element comprises assembling a frame, which is perforated and has: (i) a bar positioned along a first axis, and (ii) at least first and second arms that are coupled to and extended from the bar along a second axis, different from the first axis.

11. The method according to claim 10, wherein assembling the mounting element comprises assembling the mounting element to the substrate conveyor at production of the digital printing system.

12. The method according to claim 10, wherein assembling the mounting element comprises assembling the mounting element to the substrate conveyor of the digital printing system after concluding the production of the digital printing system.

13. The method according to claim 12, wherein assembling the mounting element comprises assembling the mounting element to the substrate conveyor of the digital printing system after installing the digital printing system at a printing facility.

14. The method according to claim 10, wherein assembling the mounting element comprises assembling (i) the bar, or (ii) the first and second arms parallel to a movement direction of the target substrate.

15. The method according to claim 10, wherein the first and second arms are positioned (i) parallel to one another along the second axis, and (ii) at a first distance from one another along the first axis, wherein at least first and second positions among the multiple respective positions are located at a second distance from one another, and wherein fixing the multiple rotatable elements comprises positioning at the second distance from one another, first and second rotatable elements among the multiple rotatable elements.

16. The method according to claim 15, wherein the first distance is different from the second distance.

17. The method according to claim 10, wherein fixing the multiple rotatable elements comprises fixing at least a ball.

18. The method according to claim 10, wherein at least one of the perforated plates comprises at least a slot, and comprising, mounting at least one of the rotatable elements on a wire, and wherein fixing the multiple rotatable elements comprises positioning the wire in the slot at a first angle, and locking the wire to the perforated plate at a second angle, different from the first angle.

* * * * *